March 24, 1959     H. G. BURGOYNE     2,878,968
MACHINE FOR DISPENSING BEVERAGES
Filed July 11, 1955
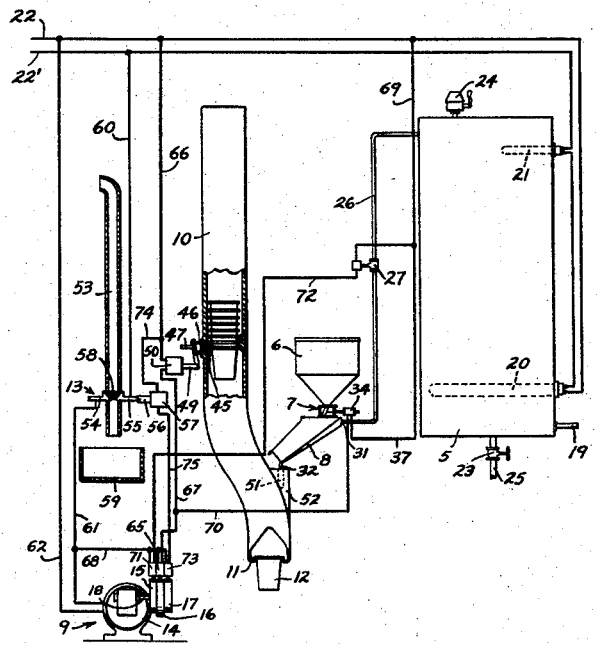
Fig. 1.
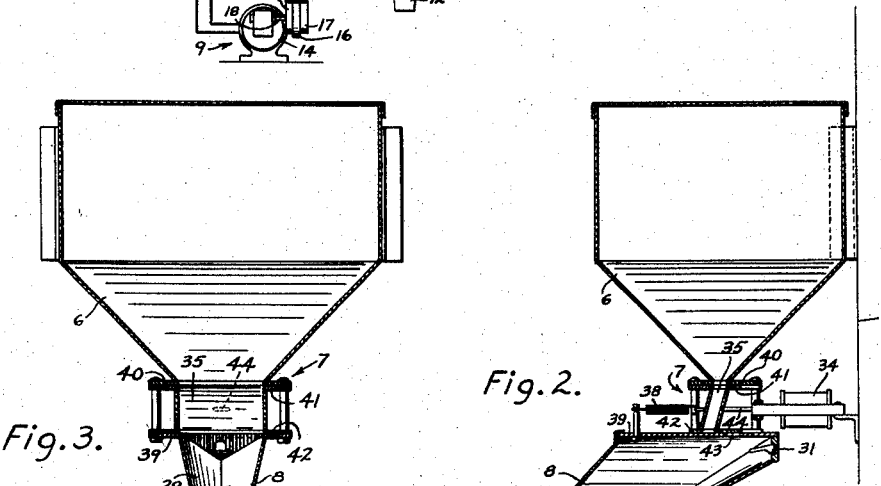
Fig. 3.    Fig. 2.    Fig. 5.
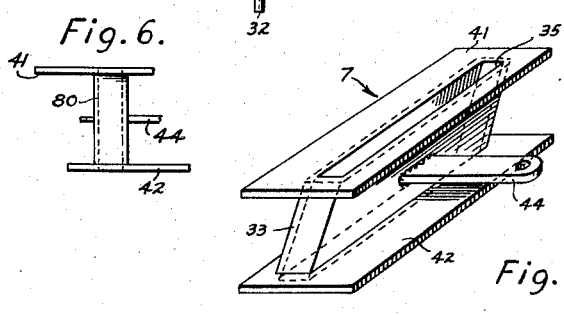
Fig. 6.    Fig. 4.
INVENTOR.
HARRIS G. BURGOYNE
BY Warren F. B. Lindsley
ATTORNEY

2,878,968
MACHINE FOR DISPENSING BEVERAGES

Harris G. Burgoyne, Green Bay, Wis.

Application July 11, 1955, Serial No. 521,229

3 Claims. (Cl. 222—129.1)

This invention relates to a method and structure for mixing and dispensing beverages from crystalline powder and more particularly to a method and machine for preparing and dispensing hot or cold chocolate milk formed from crystalline ingredients, preferably in response to the deposit of a coin in the machine.

Heretofore hot chocolate drinks for public sale were individually made when needed or if served in a public eating place such as a cafeteria were mixed ahead and served from an electrically heated thermostatically controlled hand or motor agitated dispenser. Automatically operated coin controlled hot chocolate dispensers which prepared immediately upon request an individual hot chocolate drink from dry crystalline powder mix in which the chocolate is soluble and completely dispersed throughout a milk base have heretofore been unknown. Attempts have been made to use chocolate syrup and powdered milk in a dispensing machine but this type of ingredients required refrigeration and were found to be difficult if not impossible to completely mix automatically. Further, the constant danger of Salmonella infection when using unsanitary liquid methods of handling food products such as milk and chocolate syrups made this form of hot chocolate dispensing machine undesirable regardless of refrigeration. Undesired preservatives were added to a point where some of the States outlawed their use.

In accordance with this invention a new and improved method and structure have been provided for dispensing chocolate milk formed from crystalline ingredients. This method is sanitary and simple and comprises the steps of measuring out a given quantity of dry chocolate milk crystalline ingredients, dispersing these ingredients into a mixing chamber, injecting a spray of a predetermined quantity of hot or cold water into and through the ingredients as they are dropped through the chamber in a direction substantially transversely to the path of movement of the ingredients, agitating the mixture by impinging the hot or cold water and crystalline ingredients against the walls of the container, and flushing the mixture into a serving cup. The structure provided comprises a storage bin for ingredients and a mixing chamber adapted for communicating with the bin and providing liquid inlet and discharge openings therein. An ingredient measuring device is interposed between the bin and chamber and is mounted for reciprocal movement for successive independent registry with the bin and the chamber. A cycle is set up and means are provided for injecting a liquid into the chamber through the inlet substantially transversely to the path of movement of the ingredients into the chamber. A dual purpose means is further provided for actuating the measuring device and the injection means for causing liquid to be injected into the ingredients when the measuring device is in registry with the chamber.

It is therefore one object of the present invention to provide a new and improved method for dispensing hot or cold chocolate milk.

Another object of the present invention is to provide a new and improved sanitary and simple method of dispensing chocolate milk in which dry crystalline ingredients are used.

A further object of this invention is to provide a new and improved method of making hot chocolate milk from dry chocolate milk crystals or other crystalline products in which the crystals are dispersed into a chamber and impinged against the walls of the container by hot or cold water.

A still further object of this invention is to provide a new and improved chocolate milk mixing and dispensing machine in which the chocolate milk is made immediately prior to its being dispensed.

A still further object of this invention is to provide a new mixing and dispensing machine for hot chocolate milk in which hot chocolate milk is made from chocolate crystalline milk ingredients dispersed through a spray of hot or cold water.

A still further object of this invention is to provide a new and improved mixing and dispensing machine in which the geometrical configuration of the mixing chamber effects rotation, fluidity and solubility of the ingredients.

A still further object of this invention is to provide a new and improved ingredient measuring device for the hot or cold chocolate dispensing machine.

Objects and advantages other than those set forth will be apparent from the following description when read in connection with the accompanying drawing, in which:

Fig. 1 is a diagrammatic view and wiring diagram of the elements of a mixing and dispensing machine embodying the invention;

Fig. 2 is an enlarged vertical sectional view of the storage bin, measuring device and mixing chamber illustrated in Fig. 1;

Fig. 3 is a left end view partly in cross section of the structure illustrated in Fig. 2;

Fig. 4 is an enlarged perspective view of the measuring device illustrated in Figs. 1, 2 and 3;

Fig. 5 is a partial view of a modification of the mixing chamber illustrated in Figs. 1, 2 and 3; and Fig. 6 is a partial view of a modification of the measuring device illustrated in Fig. 4.

Referring more particularly to the drawing by characters of reference, Fig. 1 illustrates diagrammatically a mixing and dispensing mechanism comprising a reservoir or tank 5 constituting a source of fluid under pressure which will be assumed herein to be water supplied by a system (not shown), a storage bin 6 for dry powder or dry crystalline ingredients, an ingredient measuring device 7, a mixing chamber 8, a dual purpose control means 9, and a cup magazine 10 with a holder 11 for a cup 12 at the lower end thereof. The coin control mechanism is generally indicated at 13. The mixing and dispensing mechanism is operated by the dual purpose control means 9 comprising a motor 14 and a series of cams 15, 16 and 17 mounted on a motor driven shaft 18.

Water is admitted to tank 5 through an inlet pipe 19 and provision is made for heating the water by means of an electric heating element 20 connected in series with a thermostatic control device 21 across an electric power circuit 22, 22'. The thermostatic control device 21 is of the well known type and is adapted to control the supply of electrical energy to element 20 to maintain a desired temperature of the water in tank 5. A drain pipe 25 is provided at the bottom of tank 5 with a manually operated valve 23 therein, and a relief valve 24 is arranged at the top of tank 5 to relieve pressure in the tank if it should become overheated. Tank 5 is supplied with water under pressure through inlet pipe 19 and furnishes heated or cold water under pressure to the mixing chamber 8 through an outlet pipe 26. The flow of water under pressure from tank 5 through pipe 26 is controlled by a solenoid controlled valve 27.

As shown more clearly in Figs. 2 and 3, the mixing chamber 8 comprising an enclosed trough-like member having a V-shaped bottom member 29 and a top member 30 is provided with a liquid inlet 31 to which pipe 26 is connected and a discharge opening 32 through which the beverage is flushed into cup 12. The bottom member 29 may be completely corrugated or the bottom member 29 may be corrugated over only part of its surface, for example, half way between bin 6 and outlet 32. Chamber 8 is supported by storage bin 6 which is suitably fastened to a frame member 28 of the mixing and dispensing device. Mixing chamber 8 communicates with bin 6 through the ingredient measuring device 7.

As shown in Fig. 5, the mixing chamber 8 may be provided with a venting means such as an exhaust fan 36 built into the top member 30 for exhausting to atmosphere outside of the dispensing machine steam vapors.

Device 7 as shown in Fig. 4 comprises a reciprocally mounted body 33 defining a hollow parallelepiped cavity 35 which is opened along opposite sides of the body for successively and independent registry with pin 6 and chamber 8. The parallelepiped cavity 35 when in registry with the open or funnel end of bin 6 fills up with the crystalline ingredient from bin 6 and when in registry with chamber 8 disperses the crystalline ingredients into chamber 8. Device 7 is actuated from bin filling position to mixing chamber dispersing position by a solenoid 34 which is energized by power circuit 22, 22¹. The parallelepiped cavity 35 of measuring device 7 is biased to the bin loading position by spring 38 and is overcome by solenoid 34 when energized to move along a track formed by end 39 of mixing chamber 8 and a flange 40 mounted on the base of the funnel shaped end of bin 6. A pair of flanges 41 and 42 formed on the ends of parallelepiped cavity 35 and arranged parallel with end 39 of chamber 8 and flange 40 of bin 6 form guiding means for cavity 35. Flange 41 also serves as a means for closing the funnel end of bin 6 while the measuring device 7 is moved from bin filling position to mixing chamber dispersing position, and flange 42 closes an opening 43 in the end 39 of the funnel shaped trough when the measuring device is moved from the mixing chamber dispersing position to bin loading position. Solenoid 34 is connected to the body 33 forming parallelepiped cavity 35 by a connecting rod 44.

Fig. 6 illustrates a modification of the measuring device illustrated in Figs. 1 to 4, inclusive, wherein the measuring device is illustrated as a body 80 defining a hollow cavity having a rectangular cross section. Body 80 may have any suitable volume or cross section which provides the desired measured amount of ingredients.

The cups 12 are individually released at the proper time by means of fingers 45 and 46 positioned respectively below and above a pivot 47 of an arm carried at the end of an armature 49 of a solenoid 50 by which the cup releasing mechanism is operated. A cup, when released, drops into the holder 11 which is beneath an outlet end of a pipe 51 extending from the funnel shaped end of the mixing chamber 8. The end of pipe 51 enters a lateral enlargement 52 on the lower part of the cup magazine 10, the latter part thereof being curved as shown in Fig. 1 so that the cup when in the holder 11 will be below the outlet end of pipe 51.

The coin control mechanism is shown diagrammatically as comprising a coin chute 53 with two coin supporting members 54 and 55 in the lower part thereof. Member 55 is slidably mounted and is attached to an armature 56 of a solenoid 57. Members 54 and 55 are made of conductive material and are arranged to support a coin 58 which electrically bridges the gap therebetween. When member 55 is withdrawn by the solenoid 57 the coin will drop into a cash box 59. The coin control is schematically shown and any suitable mechanical adaptation of this system may be used.

The circuits feeding the various solenoids and switches from power circuit 22, 22¹ will be indicated in the description of its operation. Upon the insertion of a coin in the coin chute 53, the coin falls upon the contact support members 54 and 55 bridging the gap therebetween and completing the electrical circuit from power conductor 22¹ through conductor 60, support member 55, coin 58, support member 54, conductor 61, motor 14, conductor 62 to power conductor 22. The energization of motor 14 causes rotation of the motor drive shaft 18 carrying the three cams 15, 16 and 17. Cam 16 upon rotation closes a switch 65 associated therewith, as well known in the art, thereby energizing the cup delivery solenoid 50 from conductor 22 through conductor 66, solenoid 50, conductor 67, switch 65, conductor 68, conductor 61, support member 54, coin 58, support member 55, conductor 60 and to conductor 22¹ of the power circuit. The closure of switch 65 by cam 16 also energizes solenoid 34 from conductor 22 through conductor 69, solenoid 34, conductor 70, switch 65, conductor 68, conductor 61, support member 54, coin 58, support member 55, conductor 60 to power conductor 22¹. Upon further rotation of shaft 18 of motor 14, cam 15 closes a switch 71 which energizes the solenoid of the valve 27 from conductor 22 through conductor 69, the solenoid of valve 27, conductor 72, switch 71, conductor 68, conductor 61, support member 54, coin 58, support member 60 and to the power conductor 22¹. Switch 71 remains open long enough to cause a measured amount of hot or cold water to flow downward into the mixing chamber 8 into which the powder or dry crystalline ingredients are being dispersed.

The chocolate milk crystalline ingredients or crystalline milk and powder chocolate ingredients are dispersed into the mixing chamber 8 during the time or slightly before the hot water is injected into chamber 8. The water is injected transversely to the path of movement of the dispersed chocolate milk crystalline ingredients so that the hot water spray picks up the crystalline ingredients and forces or impinges the ingredients against the top 30 and sides of the enclosed V-shaped trough. The hot water and the crystalline ingredients then are agitated by swirling around in the trough and the ingredients completely dissolve in the hot water and are flushed out into cup 12.

Further rotation of the cam shaft 18 of motor 14 causes the cam to open the switch 71 thereby deenergizing the solenoid of valve 27 and causing valve 27 to close.

Finally, further rotation of cam shaft 18 causes cam 17 to momentarily close switch 73 thereby energizing the coin release solenoid 57 from power conductor 22, through conductor 66, conductor 74, solenoid 57, conductor 75, switch 73, conductor 68, conductor 61, support member 54, coin 58, support member 55, conductor 60, and power conductor 22¹. This causes the coin to be released and to drop into the box 59. The releasing of coin 58 from support members 54 and 55 deenergizes the dispensing machine and it remains inactive until another coin is placed in the coin slot.

This new and improved sanitary and simple method and dispensing machine makes it possible to enjoy hot or cold chocolate milk which is made from dry crystalline ingredients at a moment's notice. The crystalline ingredients are soluble in hot or cold water to form a beverage which has a smooth, even texture throughout. Heretofore chocolate milk had not been prepared in this manner or from the ingredients disclosed, and therefore, this method and structure are believed to be new.

In the practice of producing chocolate milk by this method and structure it has proven successful to place a mixture of chocolate milk crystals or a mixture of seventy-five percent of crystalline instant milk powder and twenty-five percent of instant chocolate flavor mix in the bin 6. When the vending or mixing dispensing machine is energized one ounce of the above ingredient is taken from bin 6 by body 33 and released by gravity into the mixing chamber 8. The dispersed mixture is impinged upon by the spray of liquid before and during the time it moves toward the bottom member 29 of the trough. The geometrical configuration of the trough causes the spray or jet of hot or cold water to agitate the mixture and flushes the completely dissolved ingredients into the cup 12.

This method and structure can be effectively used on the back bars of restaurants, in cafeterias, "drive-ins," airports, etc., for rapidly and efficiently producing hot or cold chocolate milk or any other drink formed from dry crystalline ingredients. Where the public is not expected to pay immediately for the drink such as in a cafeteria or if the structure is utilized, for example, on a back bar the coin and cup dispensing means and associated electrical controls may be eliminated.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. A beverage mixing and dispensing device comprising a storage bin for ingredients, a mixing chamber comprising a top member having an inlet opening for the admittance of the ingredients for gravity flow into said chamber, a first side member, a second side member located opposite said first side member, a trough shaped bottom composed of two converging downwardly directing walls having an outlet at the bottom of said trough, and an inlet in said first side member located near the top of said chamber for the admittance of fluid into said chamber in a stream transversely to the flow of the ingredients, an ingredient measuring device interposed between said bin and said chamber and being mounted for reciprocal movement for successive independent registry with said bin and said chamber, said measuring device when in registry with said opening of said top member of said chamber dispersing ingredients into said chamber against the bottom of said trough, means for injecting a liquid through said inlet and against said second side member of said chamber, said injection means being arranged to spray liquid into the ingredients as the ingredients are being dispersed into said chamber, and dual purpose means for actuating said measuring device into registry with said opening of said top member and causing said injection means to inject liquid into the ingredients.

2. A beverage mixing and dispensing device comprising a storage bin for ingredients, a mixing chamber comprising a top member having an inlet opening for the admittance of the ingredients for gravity flow into said chamber, a first side member, a second side member located opposite said first side member, a trough shaped bottom composed of two corrugated converging downwardly directing walls having an outlet at the bottom of said trough, and an inlet in said side member located near the top of said chamber for the admittance of fluid into said chamber in a stream transversely to the flow of the ingredients, an ingredient measuring device interposed between said bin and said chamber and comprising a reciprocally mounted body defining a hollow parallelepiped cavity for successive independent registry with said bin and said chamber, said measuring device when in registry with said bin filling up said cavity with the ingredients and when in registry with said opening of said top member of said chamber dispersing ingredients in said cavity against the bottom of said trough, means for injecting a liquid through said inlet and against said second side member of said chamber, said injection means being arranged to spray liquid into the ingredients as the ingredients are being dispersed into said chamber, and dual purpose means for actuating said measuring device into registry with said opening of said top member of said chamber and causing said injection means to inject liquid into the ingredients.

3. A beverage mixing and dispensing device comprising a storage bin for ingredients, a mixing chamber comprising a top member having an inlet opening for the admittance of the ingredients for gravity flow into said chamber, a first side member, a second side member located opposite said first side member, a trough shaped bottom composed of two converging downwardly directing walls having an outlet at the bottom of said trough, and an inlet in said first side member located near the top of said chamber for the admittance of fluid into said chamber in a stream transversely to the flow of the ingredients, an ingredient measuring device interposed between said bin and said chamber and comprising a reciprocally mounted body defining a hollow cavity for successive independent registry with said bin and said chamber, said measuring device when in registry with said bin filling up said cavity with the ingredients and when in registry with said opening of said top member of said chamber dispersing ingredients in said cavity against the bottom of said trough, means for injecting a liquid through said inlet and against said second side member of said chamber, said injection means being arranged to spray liquid into the ingredients as the ingredients are being dispersed into said chamber, and dual purpose means for actuating said measuring device into registry with said chamber and causing said injection means to inject liquid into the ingredients.

References Cited in the file of this patent

UNITED STATES PATENTS

| | | |
|---|---|---|
| 1,758,999 | Carns | May 20, 1930 |
| 2,558,522 | Knapp | June 26, 1951 |
| 2,614,738 | Mills | Oct. 21, 1952 |
| 2,621,838 | Price | Dec. 16, 1952 |
| 2,654,505 | Fuhrman | Oct. 6, 1953 |
| 2,660,351 | Thompson | Nov. 24, 1953 |
| 2,682,984 | Melikian et al. | July 6, 1954 |
| 2,685,393 | Thompson | Aug. 3, 1954 |